US009652933B2

(12) United States Patent
Johnson et al.

(10) Patent No.: US 9,652,933 B2
(45) Date of Patent: *May 16, 2017

(54) SLOT MACHINE GAME WITH EXPANDING POSITIONS

(71) Applicant: EVERI GAMES, INC., Austin, TX (US)

(72) Inventors: Bradley W. Johnson, Austin, TX (US); Clint A. Owen, Austin, TX (US); Brian A. Watkins, Austin, TX (US); Allison Pope, Austin, TX (US)

(73) Assignee: Everi Games Inc., Austin, TX (US)

( * ) Notice: Subject to any disclaimer, the term of this patent is extended or adjusted under 35 U.S.C. 154(b) by 147 days.

This patent is subject to a terminal disclaimer.

(21) Appl. No.: 14/099,195

(22) Filed: Dec. 6, 2013

(65) Prior Publication Data

US 2014/0094263 A1 Apr. 3, 2014

Related U.S. Application Data

(63) Continuation of application No. 13/231,534, filed on Sep. 13, 2011, now Pat. No. 8,602,868.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC ...... *G07F 17/3244* (2013.01); *G07F 17/3213* (2013.01); *G07F 17/3267* (2013.01)

(58) Field of Classification Search

CPC ... G07F 17/32; G07F 17/3211; G07F 17/3213

USPC .................................................... 463/16, 20

See application file for complete search history.

(56) References Cited

U.S. PATENT DOCUMENTS

| | | | |
|---|---|---|---|
| 3,642,287 | A | 2/1972 | Lally et al. |
| 5,722,891 | A | 3/1998 | Inoue |
| 6,375,570 | B1 | 4/2002 | Poole |
| 6,544,120 | B2 | 4/2003 | Ainsworth |
| 6,561,900 | B1 | 5/2003 | Baerlocher et al. |
| 6,612,575 | B1 | 9/2003 | Cole et al. |
| 6,758,473 | B2 | 7/2004 | Seelig et al. |
| 6,896,260 | B2 | 5/2005 | Pierce |
| 6,929,545 | B2 | 8/2005 | Vancura |
| 6,960,134 | B2 | 11/2005 | Hartl et al. |
| 7,014,560 | B2 | 3/2006 | Glavich et al. |
| 7,601,062 | B2 | 10/2009 | Cole et al. |

(Continued)

FOREIGN PATENT DOCUMENTS

JP 2004290431 A 10/2004

*Primary Examiner* — Milap Shah

*Assistant Examiner* — Jason Pinheiro

(74) *Attorney, Agent, or Firm* — Nathan Calvert, Esq.; Russell D. Culbertson, Esq.; JP Cody, Esq.

(57) ABSTRACT

Systems, methods, and program products are taught which provide a slot machine game that increases the size of the symbol array as a mystery feature. As the player spins the reels, the number of positions available on each reel grows randomly to allow more paylines. Other embodiments may include free spin bonuses, as well as bonus features that further increase the number of positions on each reel, and adjust the probability of reel expansions based on the current array size.

12 Claims, 15 Drawing Sheets

(56) References Cited

U.S. PATENT DOCUMENTS

| | | | | |
|---|---|---|---|---|
| 7,717,786 | B1 | 5/2010 | Falciglia, Sr. | |
| 2004/0048645 | A1 | 3/2004 | Webb et al. | |
| 2004/0140612 | A1 | 7/2004 | Sines et al. | |
| 2005/0026678 | A1 | 2/2005 | Kaminkow | |
| 2005/0056995 | A1 | 3/2005 | Tempest et al. | |
| 2005/0075159 | A1* | 4/2005 | Kaminkow et al. | 463/16 |
| 2005/0148384 | A1 | 7/2005 | Marks et al. | |
| 2005/0159208 | A1* | 7/2005 | Pacey | 463/20 |
| 2005/0250581 | A1 | 11/2005 | White et al. | |
| 2006/0025198 | A1* | 2/2006 | Gail et al. | 463/19 |
| 2006/0058097 | A1 | 3/2006 | Berman et al. | |
| 2006/0068892 | A1 | 3/2006 | Gomez et al. | |
| 2006/0073878 | A1 | 4/2006 | Shackelford et al. | |
| 2006/0121978 | A1 | 6/2006 | Hornik et al. | |
| 2006/0142077 | A1 | 6/2006 | Miles et al. | |
| 2006/0197279 | A1 | 9/2006 | Shimizu et al. | |
| 2007/0060295 | A1 | 3/2007 | DeMar et al. | |
| 2008/0113696 | A1 | 5/2008 | Owen et al. | |
| 2009/0069073 | A1* | 3/2009 | Gerrard et al. | 463/25 |
| 2010/0203948 | A1* | 8/2010 | Falciglia, Sr. | 463/20 |

* cited by examiner

900

SLOT MACHINE GAME WITH EXPANDING POSITIONS

CROSS REFERENCE TO RELATED APPLICATIONS

This application is a continuation of, and Applicant claims the benefit under 35 U.S.C. §120 of, U.S. patent application Ser. No. 13/231,534, filed Sep. 13, 2011, and entitled "SLOT MACHINE GAME WITH EXPANDING POSITIONS." The entire content of this application is incorporated herein by this reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all rights.

TECHNICAL FIELD OF THE INVENTION

The invention relates to gaming systems and gaming machines through which players may participate in wagering games. More particularly this invention relates to methods for conducting an expanding reel or expanding symbol array type game, where the number of positions on each reel, expand to include more paylines.

BACKGROUND OF THE INVENTION

Various slot machines use methods of expanding the game symbol array by adding more columns (multi-symbol reels) or rows to increase game variation and player enjoyment. What is needed are better and more entertaining game features that provide array size variation and varied numbers of paylines in different game features.

SUMMARY OF THE INVENTION

The present invention includes an innovative and highly entertaining method for conducting a game for one or more players. The entertainment is achieved in part by providing a slot machine game that increases the size of the symbol array as a mystery feature. The preferred method starts with five reels and has four positions on each reel. As the player spins the reels, the number of positions available on each reel grows randomly to allow more paylines. Other embodiments may include free spin bonuses, as well as bonus symbols to further increase the number of positions on each reel.

Another version of the inventions is a computer program stored on a non-transitory readable medium. The software version of course is designed to be executable by a gaming machine or networked gaming system. The software includes multiple portions of computer executable code referred to as program code. Gaming results are provided in response to a wager and displayed by display program code that generates simulated slot machine reels each including one or more symbol locations. The program code also has game controller program code for determining game play results involving the selection bonus game.

Another version of the invention is a gaming system that includes one or more gaming servers, and a group of electronic gaming machines connected to the servers by a network. The various functionality described herein may be distributed between the electronic gaming machines and the gaming servers in any practically functional way. For example, the current preferred architecture is for the servers to determine all aspects of game logic, random number generation, and prize awards. The gaming machines provide functionality of interfacing with the player and animating the game's presentation of the results received from the server in an entertaining manner. However, other embodiments of course might use a thin client architecture in which the animation is also conducted by the server and electronic gaming machines serve merely as a terminal to receive button or touchscreen input from the player and to display graphics received from the server. Some systems may also employ an ultra-thin architecture, in which the gaming machine does not run a full operating system, and instead only sends inputs and displays video received from the server.

These and other advantages and features of the invention will be apparent from the following description of the preferred embodiments, considered along with the accompanying drawings.

DETAILED DESCRIPTION OF PREFERRED EMBODIMENTS

Figure 1A:
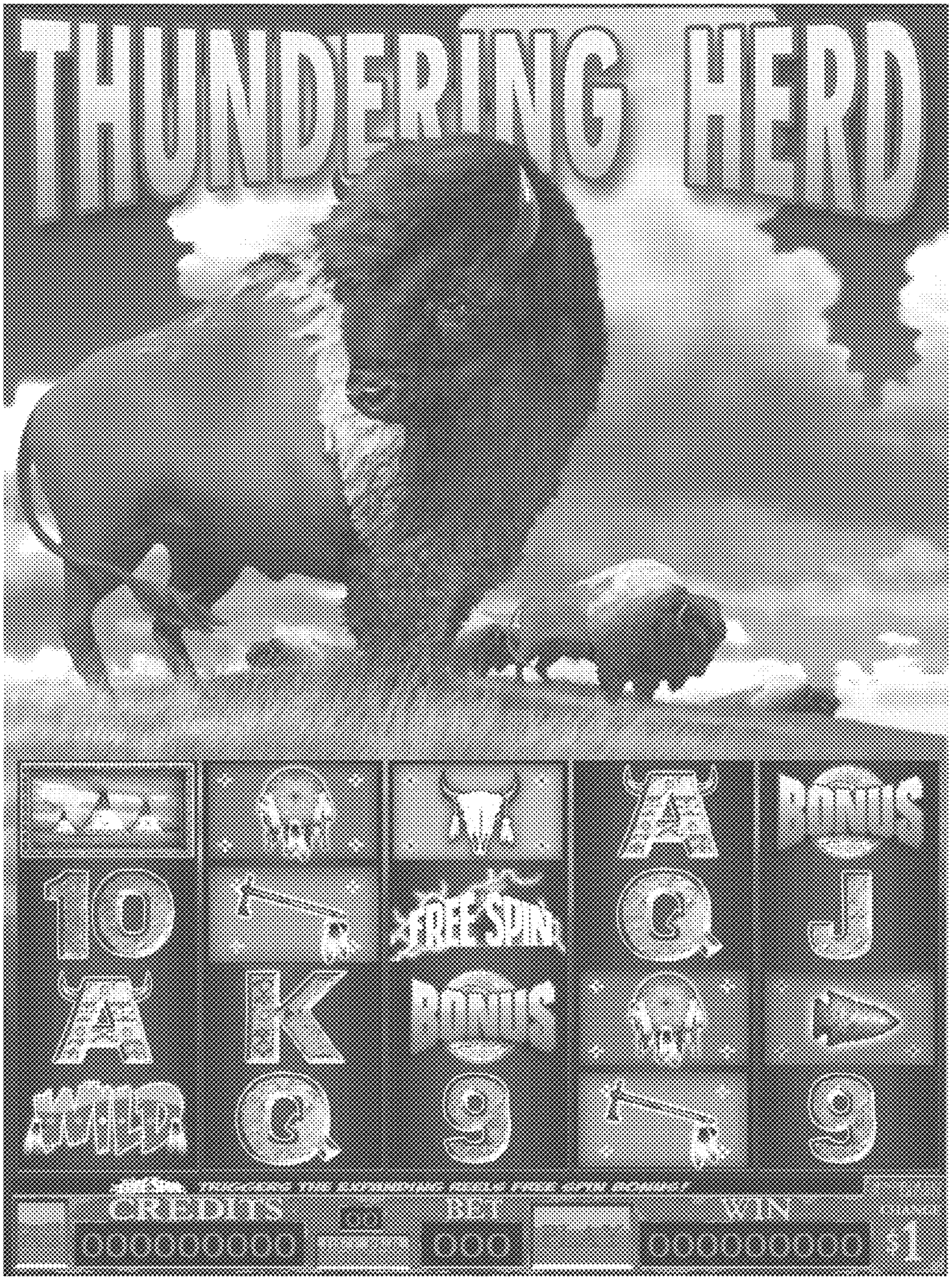
FIG. 1A is a screenshot of a base game screen of a Thundering Herd game according to one example embodiment.
Figure 1B:
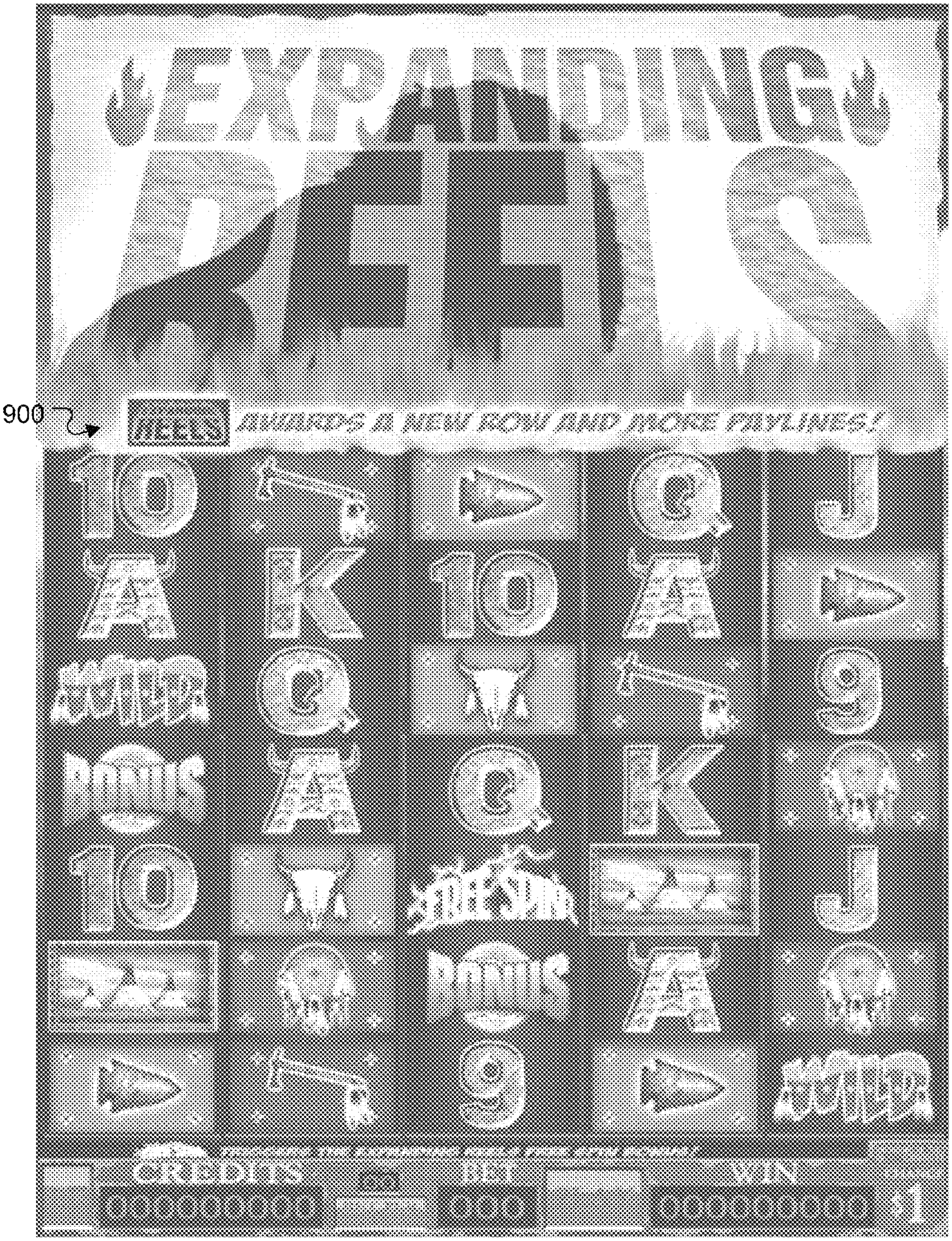
FIG. 1B is a screenshot of the Thundering Herd game showing a free spin bonus round in which expansion bonuses are provided that add rows to the symbol array in the free spin bonus round.
Figure 1C:
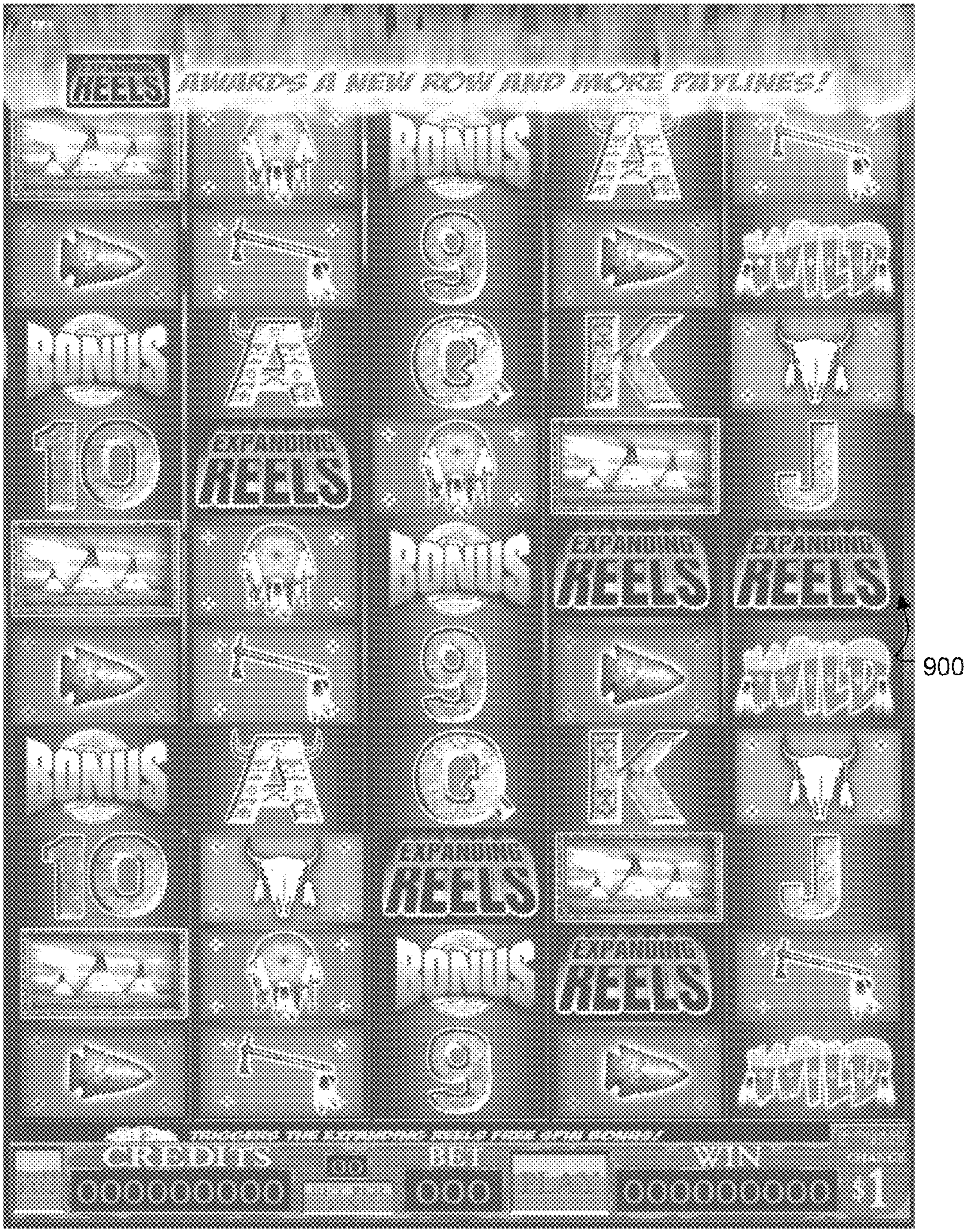
FIG. 1C is a screenshot of the Thundering Herd game demonstrating the maximum expansion of the reels in a bonus round according to one embodiment of the invention.

FIGS. 1A-C show game screenshots from an example game entitled Thundering Herd and having a high plains/buffalo theme. The depicted features will be described further after discussing the game screen diagrams in FIGS. 1D-G.

Figure 1D:
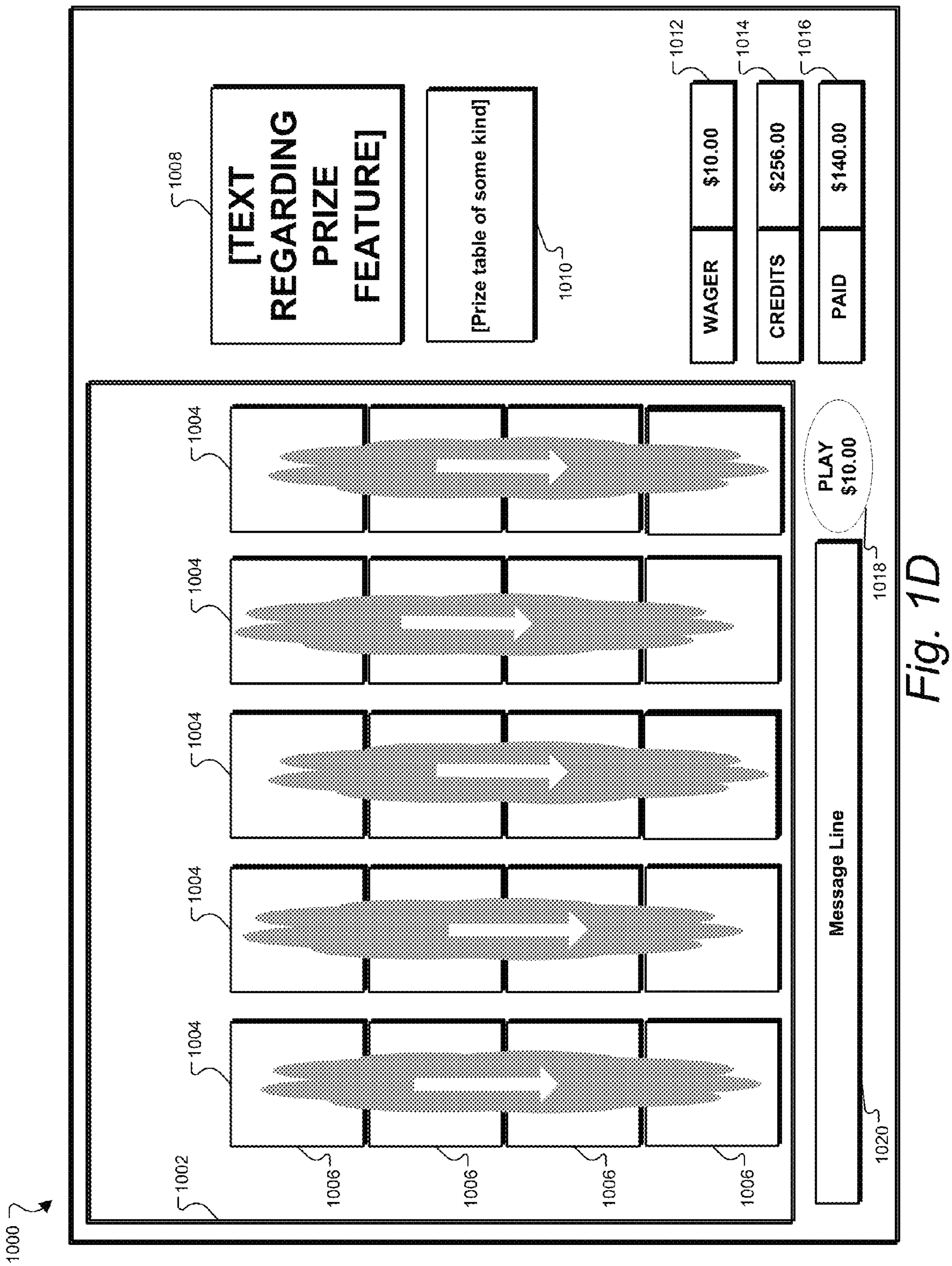
FIG. 1D is a game screen diagram of the reels spinning before any positions have been expanded according to one embodiment of the invention.

FIG. 1D shows an example of a game screen with the reels still spinning and before any expanding reels, according to one embodiment of the invention. In this example, game screen 1000 has a matrix of symbol locations 1002, including five reels 1004. Each of the five reels has four symbol locations 1006. The depicted reels 1004 are shown with graphics greyed out and arrows to indicate that they are in rotation, with a blur of symbols passing down the graphic display of each reel as the game presents the simulated reel spin to depict game play.

Figure 1E:
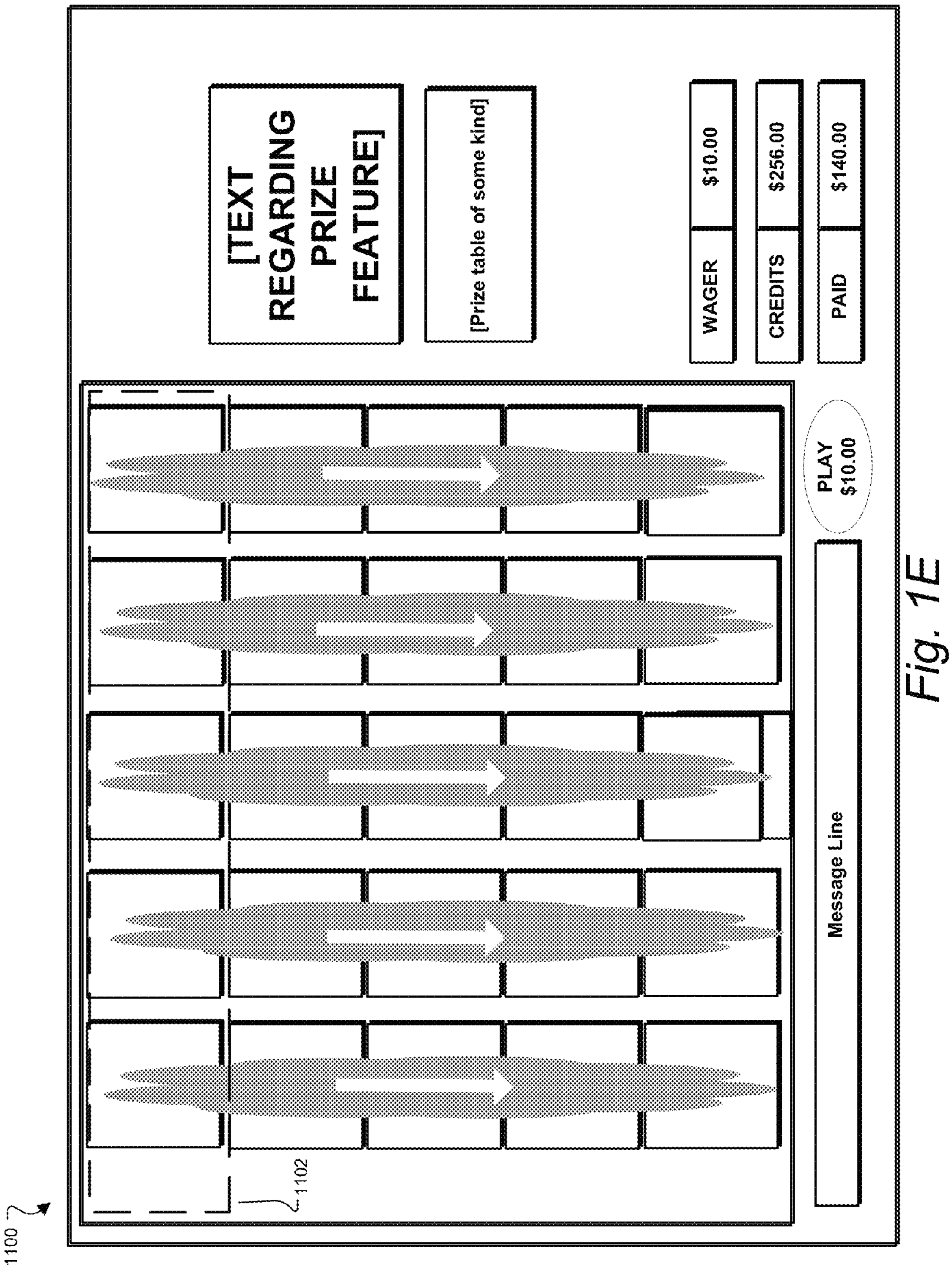
FIG. 1E is a game screen diagram of the reels spinning after the positions have been expanded according to one embodiment of the invention.

FIG. 1E shows the example game screen of FIG. 1A after the Thundering Herd game causes a mystery expansion. The game screen now features an additional row 1102 on the reels. Referring now to FIGS. 1D and 1E, the mystery expansion feature may be seen. The mystery expansion feature adds one or more rows to the matrix of symbol locations 1002 based on a mystery, or random and unseen, determination made by the game logic. In this version, the mystery feature occurs before the final game result is presented, so the player does not see any apparent reason in the symbols depicting the game result for the row of symbols to have been added. While the reels are still spinning, the mystery feature adds a row 1102, as depicted in FIG. 1E, thereby expanding the matrix of symbol locations and the number of paylines which may be formed through the matrix. As shown by the grayed out symbol locations and the white arrows depicting motion in FIG. 1E, the reels are still spinning as the additional row is being added. This may be accompanied by a suitable animation with a graphic depiction of row 1102 being added to the matrix. Preferably, the mystery expansion feature also shows an animation depicting an expansion of the area occupied by the symbol array 1100, or a reduction in size of the existing symbols so that the array fits in the same area after an additional row has been added. An animation may also show the formation or arrival of new paylines that are formed including the symbols 1006 in the new row 1102.

While the depicted mystery expansion feature in FIGS. 1D and 1E shows only one row being added, other versions may of course include a mystery expansion feature in which a number of rows may be added. For example, one embodiment randomly determines a number of rows to be added within a certain range such as 1 to 3 rows. After the mystery expansion feature, the game results are shown on the expanded array, using the increased number of paylines.

Referring to the other features on the game screen diagram, on the right side of game screen 1000 there is an area for a prize feature explanation 1008. Under the prize feature explanation is a prize table 1010 for convenient player reference. On the bottom right of example game screen 1000 are three boxes listing wagers 1012, credits 1014, and amount paid 1016. Underneath the matrix of symbol locations 1002 are a minimum wager indicator 1018, and a message line 1020 for presenting notifications and other game text to the player.

Figure 1F:
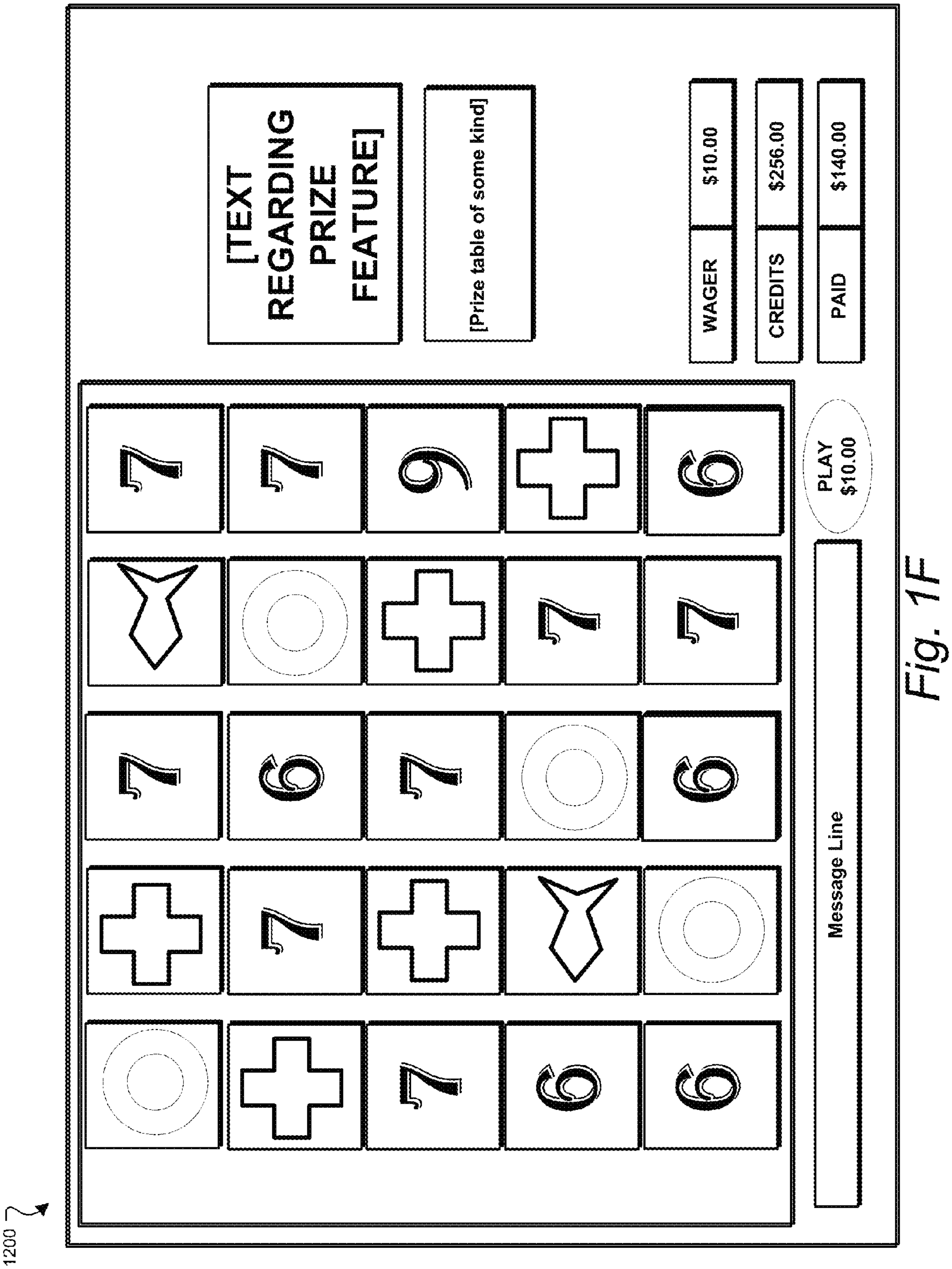
FIG. 1F is a game screen diagram after the wheels have stopped spinning according to one embodiment of the invention.

FIG. 1F shows the example game screen from Figures D and E, after the reels have stopped spinning and the matrix of symbol locations now displays a number of symbols. Notice that the expanded array is used to display the game result, and any prizes are awarded based on winning patterns formed in the expanded array including an enhanced number of paylines, and enhanced odds that scatter patterns and other bonus type patterns will be formed because of the larger number of symbols in the symbol array.

Figure 1G:
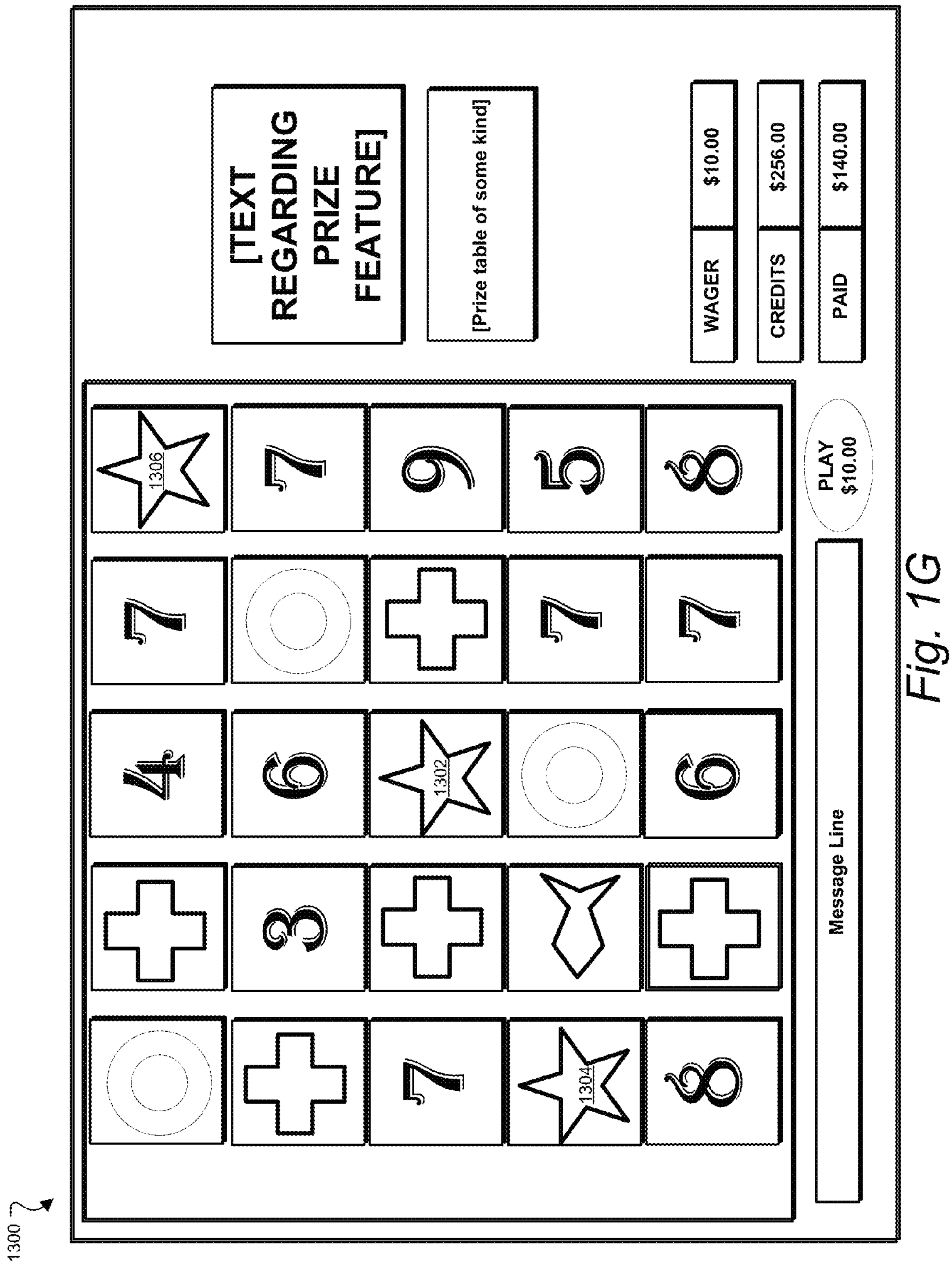
FIG. 1G is a game screen diagram showing a bonus scatter pattern that triggers a further expansion of the positions according to one embodiment of the invention.

FIG. 1G shows an alternate example game screen with a scatter pattern bonus, according to one embodiment. This example game screen has already expanded positions, and has also stopped spinning. The bonus symbols are represented by stars 1302, 1304, and 1306. Here to win the bonus, the player needs to have a symbol on reels 1, 3, and 5. It will be appreciated that, in this particular example random result, the player would not have gotten bonus symbol 1306 without the expanded top row of symbol positions.

Referring back to the graphical screenshots shown in FIGS. 1A-C, FIG. 1A shows a screenshot of one example game embodying the concepts of the invention, entitled Thundering Herd and having a high plains/buffalo theme. In the depicted screenshot, the game machine is in an attract state in which it displays various screens showing the various features of the game. Depicted on this screenshot is the base game array including various symbols comprising the game theme.

FIG. 1B is a screenshot of the Thundering Herd game showing a free spin bonus round in which expansion bonuses are provided that add rows to the symbol array in the free spin bonus round. The depicted expanding reels symbol 900 is employed as further discussed below to expand the symbol array used in the free spin bonus round.

FIG. 1C is a screenshot of the Thundering Herd game demonstrating the maximum expansion of the symbol array in a bonus round according to one embodiment of the invention. The process of conducting a bonus round with the expanding array feature is further described below.

Figure 2A:
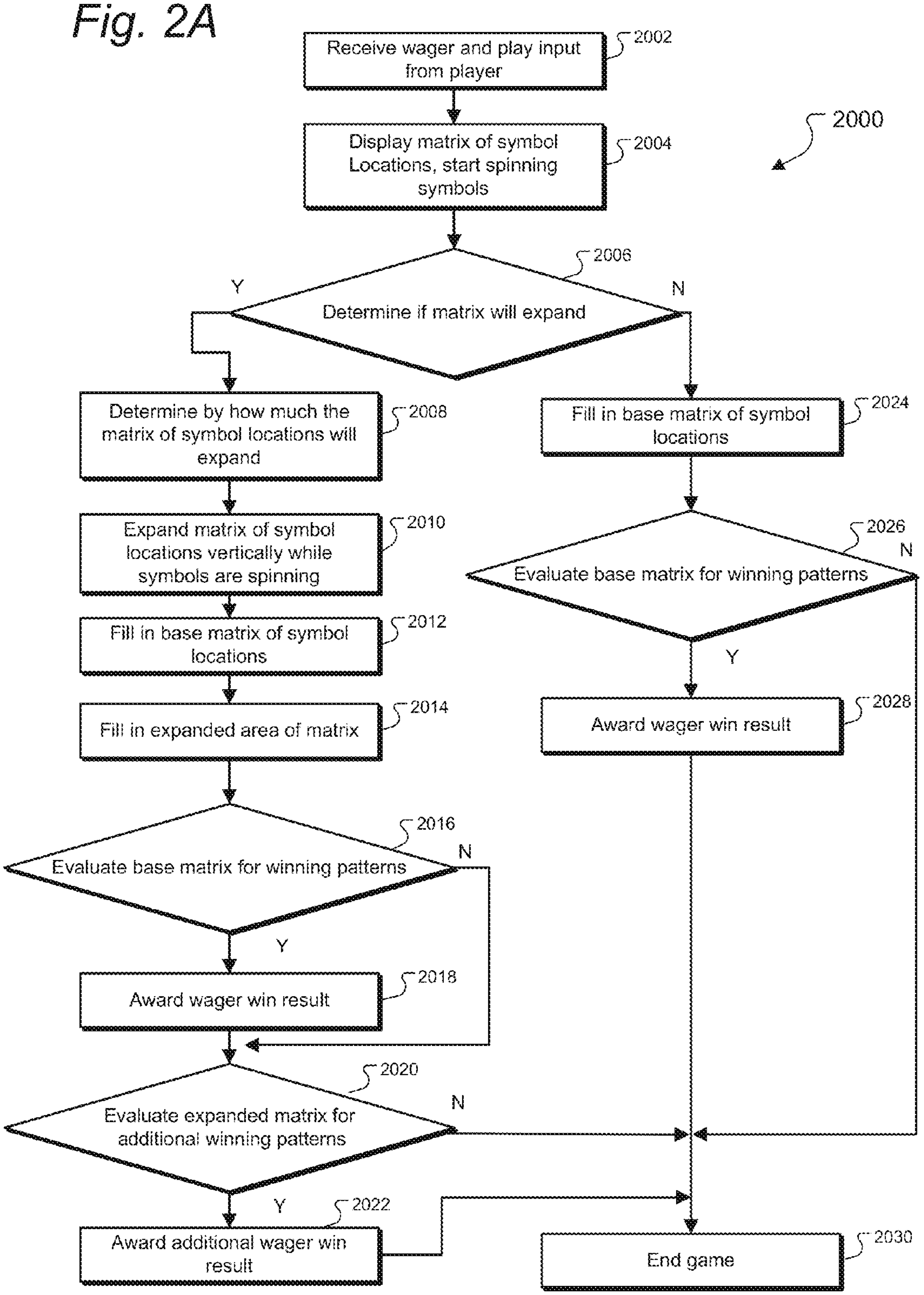
FIG. 2A is a flowchart showing one example of game play process according to one embodiment of the invention.

FIG. 2A shows a flowchart 2000 showing the general process of game play in an example embodiment. The process starts at step 2002 where the process receives a wager and a play input from the player. Next at step 2004, it causes a matrix of symbol locations to be shown. In a preferred embodiment, the matrix of symbol locations takes the form of five reels with four locations each. At this point, it should be noted that although the matrix of symbol locations is being shown, it has not been filled yet with any symbols. In other words, the reels are still spinning, or the symbol array appears to be scrambled, mixed, or otherwise in the process of being randomized.

After displaying the matrix of symbol locations, the process advances to step 2006 where it is determined whether the matrix of symbol locations will expand or not. This expansion is a mystery expansion conducted before any symbols of the final game result are displayed. There are many ways of determining whether to expand, and a preferred method would be based on a random number generation.

If the process determines that the matrix of symbol locations will expand, then the process goes to 2008. Here the process determines how much the matrix of symbol locations will expand. Although there are many ways to determine how much the matrix of symbol locations will expand, one example embodiment would simply skip this step and expand by one line of symbol positions. In other embodiments, the amount the matrix of symbol positions expands can be determined randomly or by reverse mapping a randomly selected result to a desired game presentation.

After determining how much to expand the matrix of symbol locations, the process expands the matrix of symbol locations in step 2010. As discussed with respect to FIGS. 2C and 2D, this expansion is preferably conducted as a mystery expansion while the simulated reels are still spinning, without a visual indication as to why it is occurring in this particular round. This step also typically involves providing an animation showing the symbol array expanding with graphics related to the game theme, and may also include showing an animation of paylines appearing which include the new symbol locations and increase the total number of paylines in play. Further, this step may include shifting, moving, or growing existing paylines to include new symbols in the expanded area, along with a suitable animation. Any change in paylines of course is accompanied by a change in game logic to implement the paylines.

Next, the process fills in the matrix of symbol locations with the gaming symbols that constitute the game result for the current game play, and awards any prizes for winning patterns formed thereby. This may be in a single step, or, as depicted, may occur in multiple steps in which the process fills in the original base (unexpanded) matrix of symbol locations in step 2012, and then fills in the expanded area of the matrix of symbol locations in step 2014. Although the process lists filling in the base matrix of symbol locations and filling in the expanded area of the matrix of symbol locations as separate steps, the display does not have to slow down to allow the player to perceive the two steps.

Once the base matrix and the expanded matrix have been filled in, the process goes to step 2016 where the base matrix of symbol locations is evaluated for any winning patterns. Again, this may occur in a single step without any separate valuation of the base or expanded array areas by themselves. For versions which separate the evaluation of the base expanded array areas, if there are any winning patterns in the base matrix of symbol locations the process goes to step 2018 where it awards any wins, and proceeds to step 2020 to evaluate the expanded area of the matrix for additional winning patterns. If the base matrix does not have any winning patterns, then the process will go directly to step 2020 to evaluate the expanded area of the matrix for additional winning patterns. It is advantageous but not required to evaluate the base matrix of symbol locations, and the expanded matrix separately as this will add to the excitement of the game. If the expanded area of the matrix of symbol locations presents winning patterns then the process awards the additional winnings in step 2022 before ending the game in step 2030. If there are no winning patterns in the expanded area of the matrix of symbol locations then the process goes directly to step 2030 and ends the game.

If back in step 2006, the process did not determine that the matrix of symbol locations would expand, then the process goes to step 2024 where it fills in the base matrix of symbol locations. Then the process evaluates the base matrix of symbol locations for winning patterns in step 2026. If there are any winning patterns then the process awards said win results in step 2028 before ending the game in step 2030. If there are no winning patterns in the base matrix of symbol locations in step 2026, then the process concludes the game in step 2030.

Figure 2B:
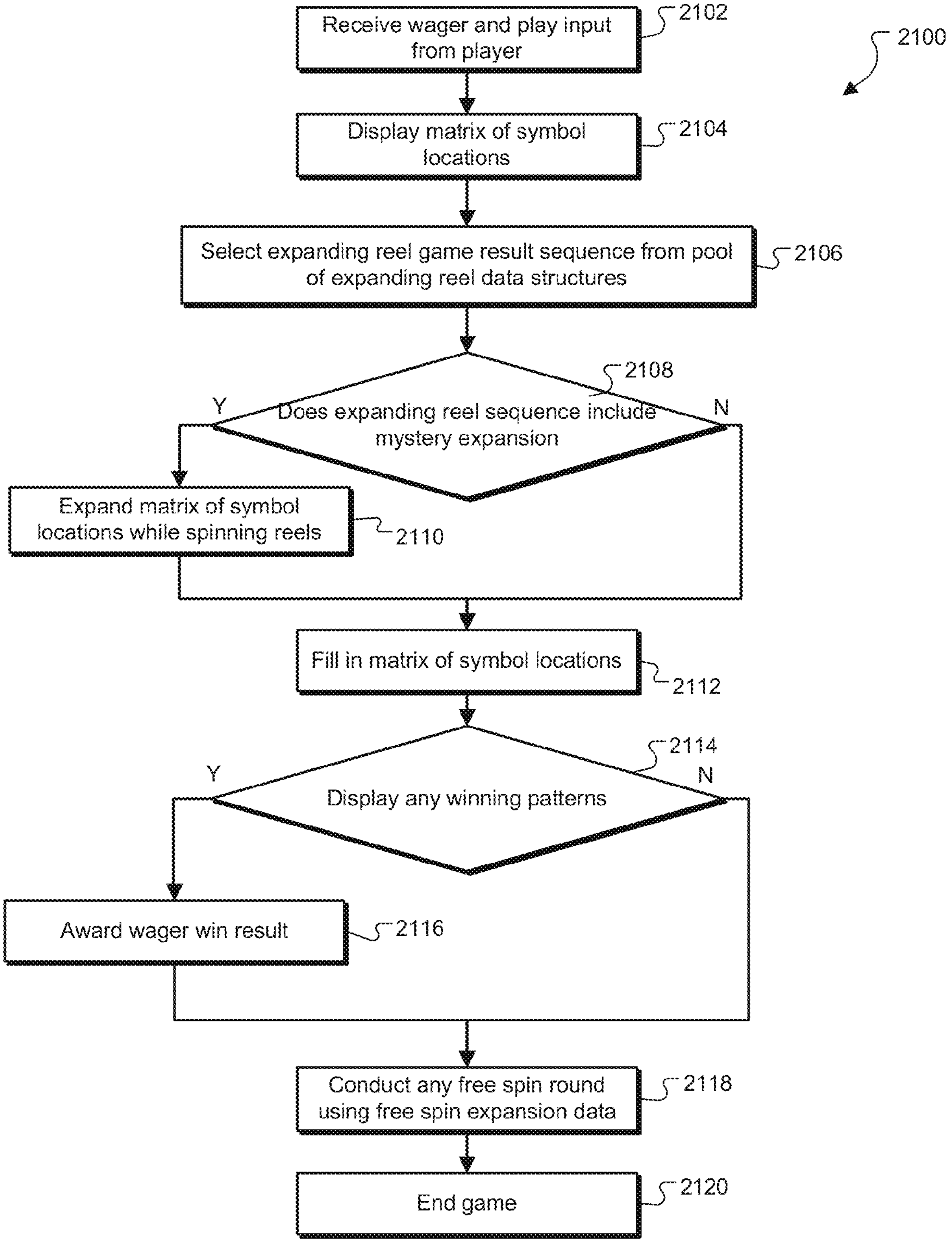
FIG. 2B is a flow chart showing a Class II game play process according to one embodiment of the invention.

FIG. 2B is a flowchart showing an example game play process that employs a Class II bingo game engine to provide game results. Class II bingo game results are advantageous in certain gaming jurisdictions where they are operable with reduced regulatory and tax requirements. This embodiment uses a Class II bingo game engine to produce a game outcome and selects a scripted game presentation that matches the outcome.

In FIG. 2B the process begins in step 2102 where it receives a wager and a play input from the player. Then the process goes to step 2104 where it displays a matrix of symbol locations. These are preferably displayed in the shape of five reels with four positions each, however other shapes and dimensions are possible. Now the process advances to step 2106 where it selects an expanding reel result sequence from a pool of expanding reel data structures. Although this embodiment selects an expanding reel sequence at this step, the selection can be made at other locations in the process. For example, the selection can be made right after the process receives the wager and play input from the player in step 2102.

As mentioned, the process selects an expanding reel sequence in step 2106. The selection is made by matching an expanding reel sequence wager value to the random or pre-generated lottery type wager value result. The expanding reel sequence will include a data structure storing variables indicating the wager value, any mystery expansions, any bonus free spin rounds and their associated expansions, and the symbols to fill in the matrix of symbol locations for each spin included in the game result.

After the process selects an expanding reel sequence from the pool of expanding reel data structures in step 2106, it determines in step 2108 whether the matrix of symbol locations will expand. As mentioned previously, the expanding reel data structure contains the instruction for expanding the matrix of symbol locations. If the process is going to expand the matrix of symbol locations, then the process moves to step 2110 and expands the matrix of symbol locations before going to step 2112 and filling in the matrix of symbol locations with symbols from the expanding reel sequence. If, on the other hand, there is no mystery expansion at step 2108, then the process fills in the matrix of symbol locations with symbols from the expanding reel sequence in step 2112.

After filling in the symbols in step 2112, the process now displays any winning patterns in the expanding reel sequence in step 2114. If the expanding reel sequence has any wager win results, the process awards them in step 2116 before going to step 2118 where it checks to determine if a free spin bonus round is present in the current result data structure. If so, it uses data from the current game result data structure to conduct a free spin bonus round, and displays any symbol array expansions indicated by the data. After the optional expanding reels bonus round, then the process ends the game in step 2120.

Figure 2C:
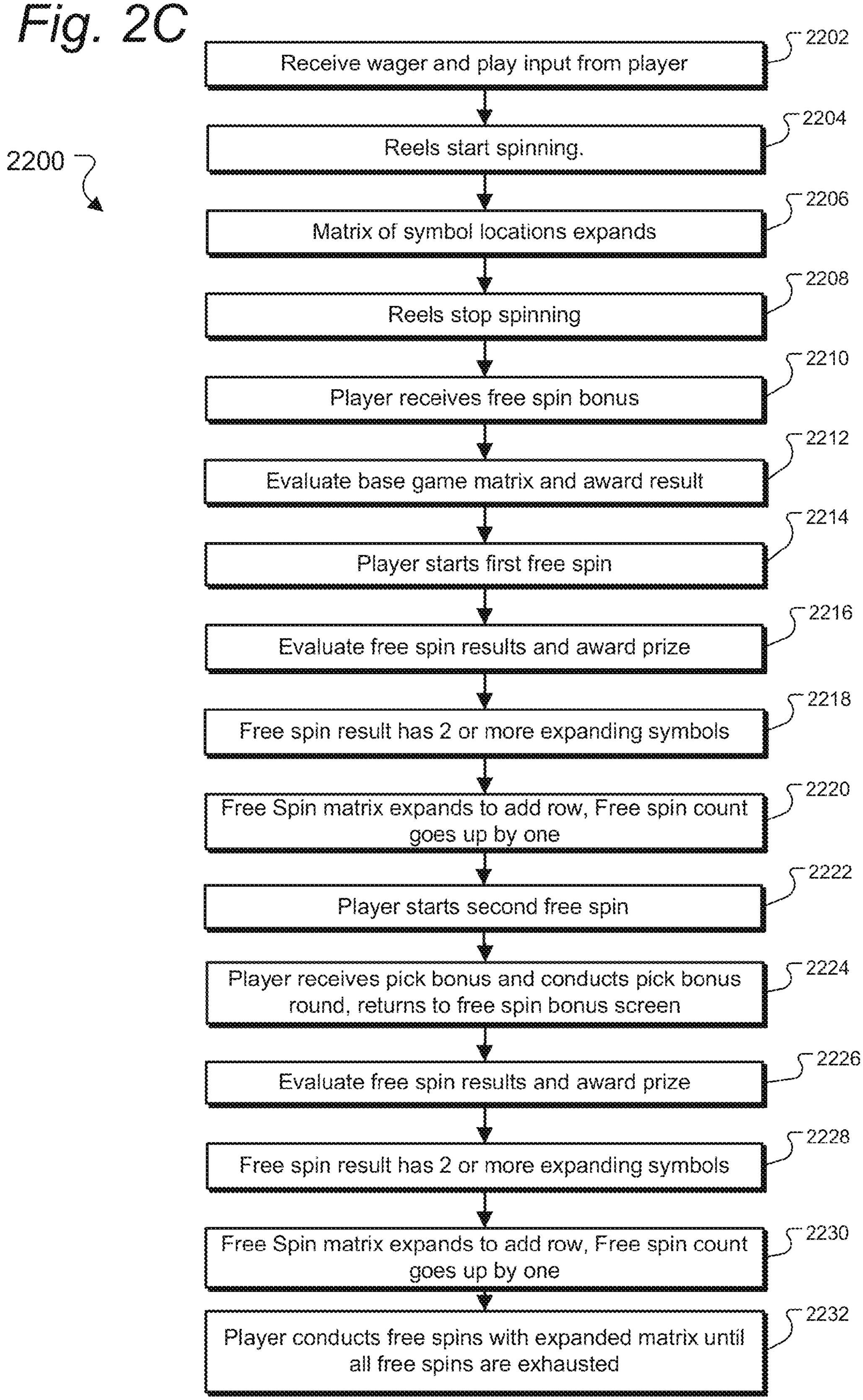
FIG. 2C is an example of a possible game play sequence according to one embodiment of the invention.

FIG. 2C is an example of a game play scenario of the expanding reel game according to one embodiment of the invention. This scenario is merely one example of how a game play might proceed when a player enters credits and conducts several rounds of game play according to one embodiment of the expanding reel game. The depicted sequence only illustrates various features of the invention, and actual game results are randomly determined.

The example scenario 2200 begins in step 2202 where the expanding reel game is started. In this scenario, the gaming machine receives a minimum bet from the player that is enough to start the game. Then the process receives a play input from the player which can be simply pushing a button, pulling a lever, or making a touchscreen input. Then the reels start spinning in step 2204. The randomly selected result includes a mystery expansion causing the reels to expand the positions by one line in step 2206.

After the reels stop expanding, they come to a stop in step 2208. It is then determined that the result includes a free spin bonus round, triggered by a scatter pattern of expanding reels symbols, in step 2210. In this scenario the game calculates any wins in step 2212 before allowing the player to start his first free spin in step 2214.

The process lets the player start his first free spin in step 2214, and then in step 2216 calculates the free spin results and awards any wins to the player. In step 2218 the process checks and finds that the player has two or more expanding symbols. Now the process expands the matrix by one row for the player and adds a free spin to the player's free spin count in step 2220.

In step 2222 the process allows the player to start his second free spin. In step 2224 the process awards the player a pick bonus. The process conducts the pick bonus round and returns to the free spin bonus screen. Then in step 2226 the process evaluates the second free spin results and awards any prizes. Now the process checks and finds two or more expanding symbols in step 2228, so in step 2230 the process expands the matrix to add another row and adds another free spin to the player's free spin count.

In step 2232, the process continues to conduct free spins with the expanded matrix until the player's free spins are exhausted, which ends the free spin bonus round and the current game play.

Figure 2D:
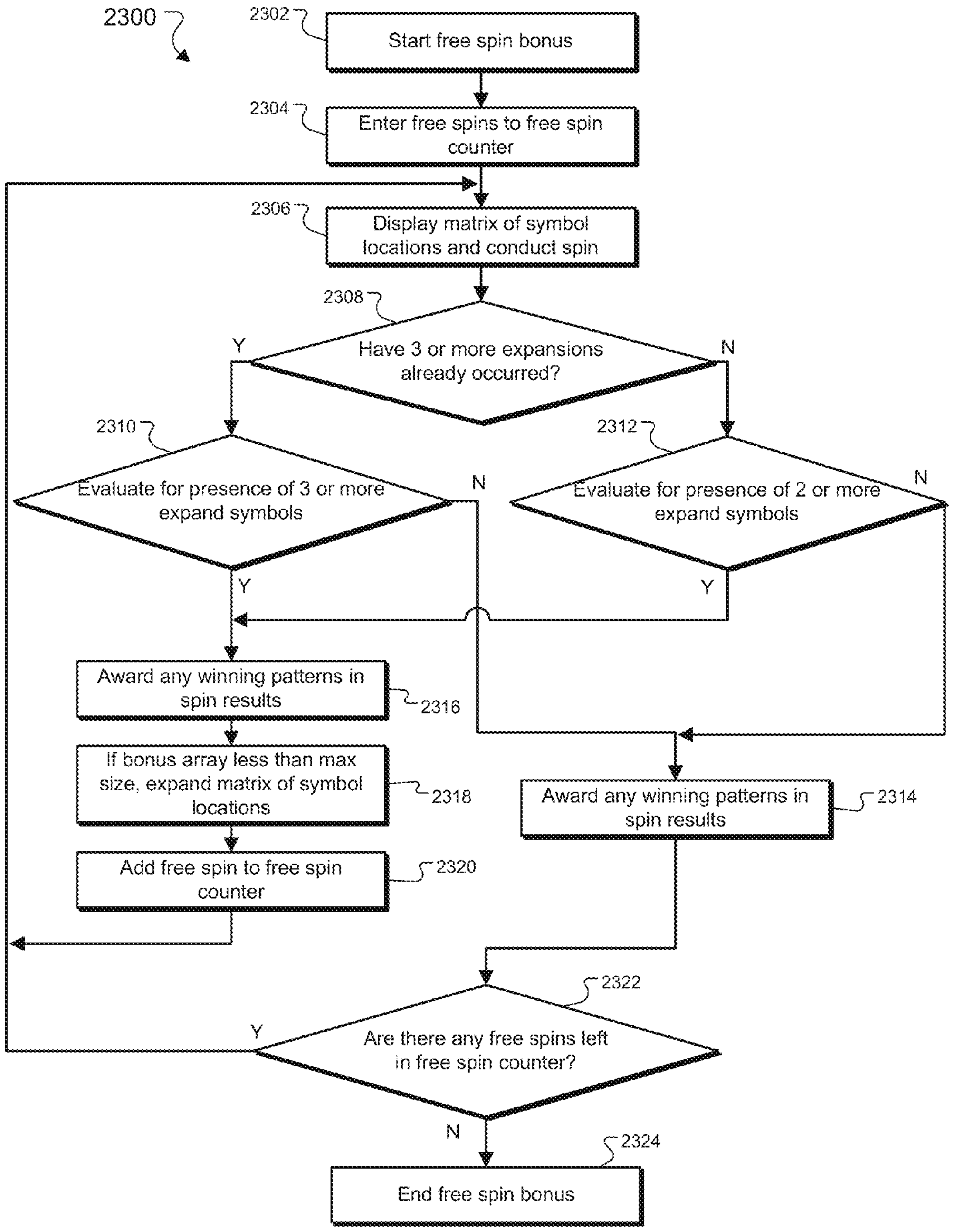
FIG. 2D is a flowchart showing a game play process of the free spin expanding bonus according to one embodiment of the invention.

FIG. 2D is a flowchart illustrating the game play process of the free spin expanding bonus according to one embodiment of the invention. The flow chart 2300 starts at step 2302 where the process has already triggered a free spin bonus game. The process first enters the number of free spins the player has been awarded to the free spin counter in step 2304. In a preferred embodiment ten free spins are awarded to the player, however other embodiments will have a different amount of free spins awarded to the player. In some versions, the number of free spins awarded may vary based on the number of scatter symbols in the triggering pattern. Once the process has entered the free spins to the free spins counter, the process moves to step 2306 where it displays the matrix of symbol locations.

In a preferred embodiment, the free-spin bonus (triggered by scatter symbols on reels 1, 3, and 5) awards 10 free spins, played with bonus reels which remove the two scatter bonus symbols from the base reels and instead have a different "EXPAND" scatter bonus symbol added to the bonus reels, on reels 1, 3 and 5. If a free spin hits two or more (i.e. three) EXPAND symbols in the reel window, then the reel window expands by one row (along with adding 25 paylines) for the next free spin, and for all remaining free spins. Also, one additional free spin is awarded, to avoid having a final free spin trigger an expansion which never applies. As the bonus round progresses, the window continues to expand by an extra row (along with 25 additional paylines) each time two or more EXPAND symbols hit in the window. Note that it gets easier to hit these EXPAND symbols as the window gets larger; to curb this tendency, the preferred version provides a rule that after 3 expansions (to 7 positions/reel), the trigger changes to requiring all three EXPAND symbols (instead of just 2) to trigger expand-extra-row and adds one free spin. After 3 more expansions (to 10 positions/reel), the window size is at its maximum allowed. If a free spin hits three EXPAND symbols when the window is already 10 positions per reel, the trigger only awards the one additional free spin.

The depicted process therefore evaluates whether an expansion will occur based on a further condition, and whether three expansions have occurred. Having the spin results at step 2306, the process moves to step 2308 where it evaluates whether three or more expansions have already taken place. If there have not been three or more expansions, then the process goes to step 2312 where it evaluates the matrix for the presence of two or more expand symbols. If there are not two or more expand symbols then in step 2314 the process awards any win results before heading to step 2322 to check whether there are any free spins left on the free spin counter. If in step 2312 the process finds two or more expand symbols, then the process moves to step 2316 where it awards any winning patterns in the spin results. Then the process goes to step 2318 where if the matrix were less than the max size, it expands the matrix. After the process advances to step 2320 where it adds a free spin to the free spin counter before going to step 2322 and checking to see if there are any free spins on the free spin counter. It can be understood that if the expand symbol has a constant probability of occurring in any location of the symbol array, then raising the number of symbols required to trigger an expansion from two to three adjusts the probability that an extension will occur in order to compensate for the increased probability of an expansion due to the increased number of symbol locations in the expanded array. The game may lower the probability in order to make it harder to achieve expansion, or may simply adjust for the increased number of symbol locations while trying to maintain a fairly constant probability that another expansion will occur in any given free spin round. (Some versions may even increase the probability of expansion at certain points in a bonus round, but this is not preferred.) In this manner the game adjusts the probability of reel expansions based on the current array size. While the depicted method allows for two nonzero probabilities of expansion, and finally a zero probability of expansion when the maximum array size is reached, other versions may of course employ other methods of adjusting the probability that include more than two nonzero probabilities of expansion.

If in step 2308 the process had discovered that three or more expansions had already occurred, then the expanded array is getting relatively large and the process makes it harder to win an expansion. The process moves to step 2310 where it evaluates for the presence of three or more expand symbols. If the process does not find three or more expand symbols, then the in step 2314 the process awards any win results before heading to step 2322 to check whether there are any free spins left on the free spin counter. If, however, the process finds three or more expand symbols in step 2310, then the process goes to step 2316 where it awards any winning patterns in the spin results. Then the process goes to step 2318 where if the matrix were less than the max size, it expands the matrix. After the process advances to step 2320, it adds a free spin to the free spin counter before going to step 2322 and checking to see if there were any free spins on the free spin counter.

If in step 2322 the process finds that there are free spins left on the free spin counter then the process returns to step 2306 where it displays another matrix of symbol locations. If the process does not find any free spins left on the free spin counter in step 2322 then the process ends the free spin bonus round in step 2324.

Figure 3A:
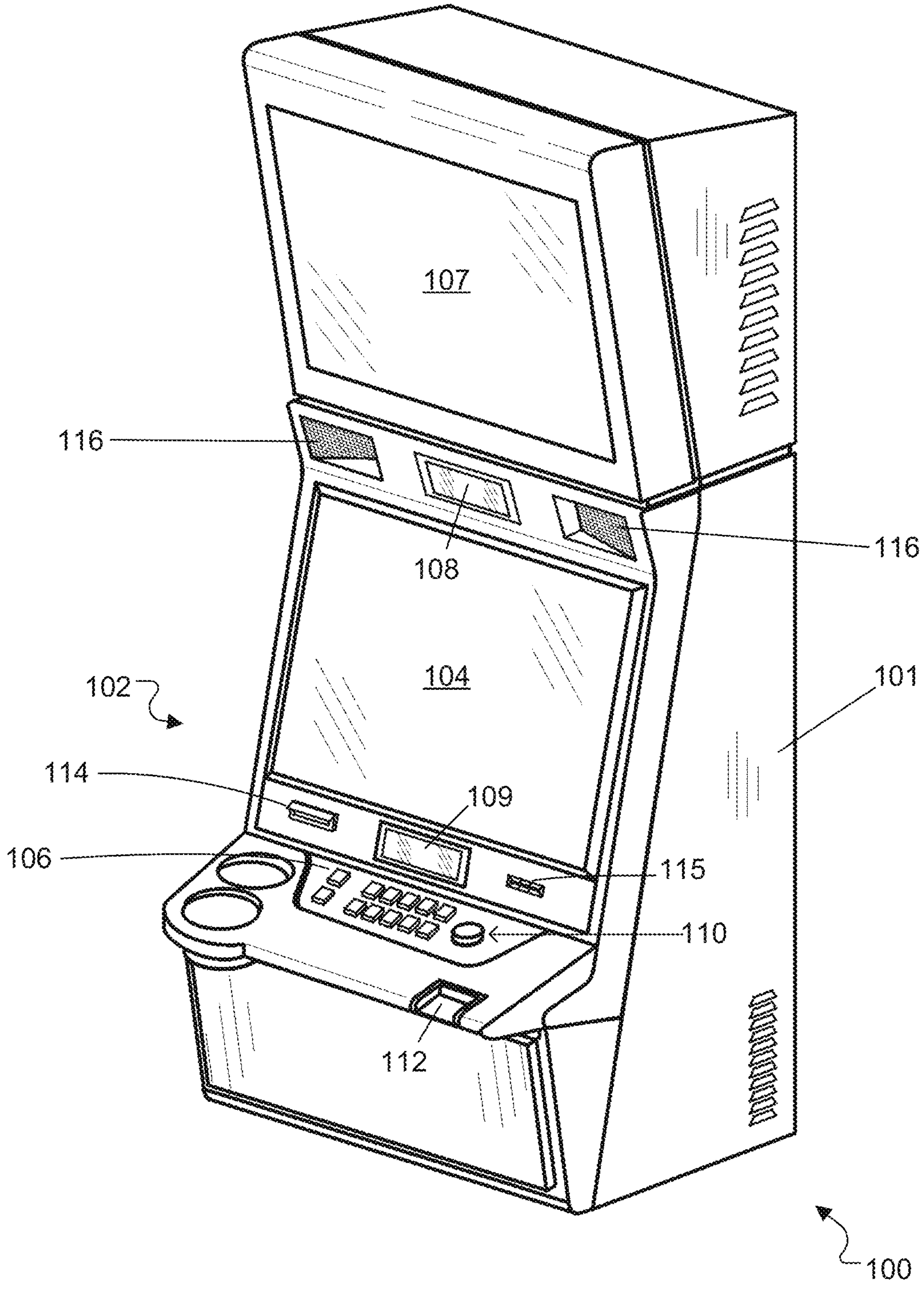
FIG. 3A is a front perspective view of a gaming machine which may be used in a gaming system embodying the principles of the present invention.
Figure 3B:
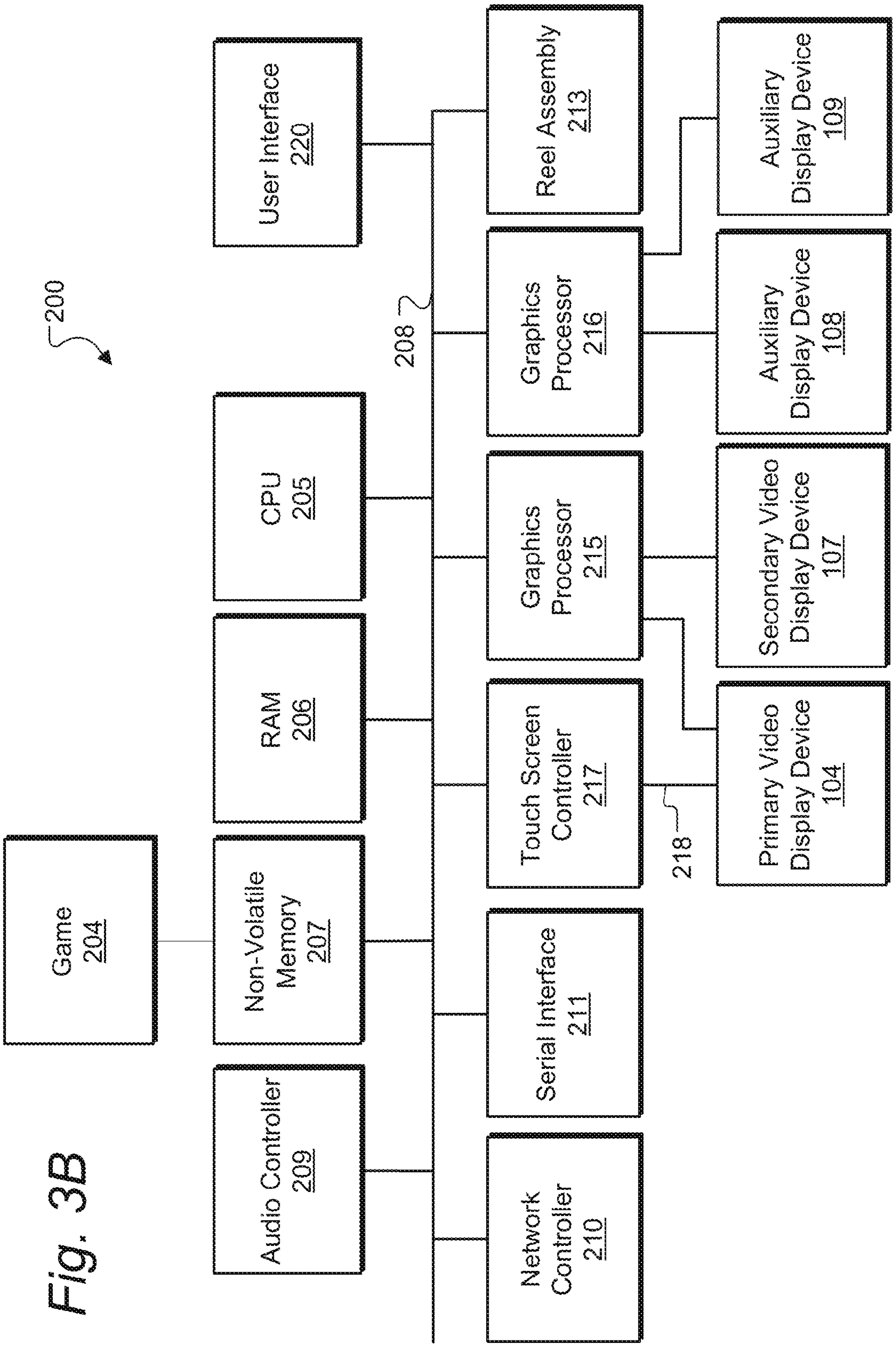
FIG. 3B is a block diagram showing various electronic components of the gaming machine shown in FIG. 3A together with additional gaming system components.

FIG. 3A shows a gaming machine 100 that may be used to implement an expanding reel game according to the present invention. The block diagram of FIG. 3B shows further details of gaming machine 100. Referring to FIG.

3A, gaming machine 100 includes a cabinet 101 having a front side generally shown at reference numeral 102. A primary video display device 104 is mounted in a central portion of the front surface 102, with a ledge 106 positioned below the primary video display device and projecting forwardly from the plane of the primary video display device. In addition to primary video display device 104, the illustrated gaming machine 100 includes a secondary video display device 107 positioned above the primary video display device. Gaming machine 100 also includes two additional smaller auxiliary display devices, an upper auxiliary display device 108 and a lower auxiliary display device 109. It should also be noted that each display device referenced herein may include any suitable display device including a cathode ray tube, liquid crystal display, plasma display, LED display, or any other type of display device currently known or that may be developed in the future.

In preferred versions, the gaming machine 100 illustrated in FIG. 3A also includes a number of mechanical control buttons 110 mounted on ledge 106. These control buttons 110 may allow a player to select a bet level, select paylines, select a type of game or game feature, and actually start a play in a primary game. Other forms of gaming machines according to the invention may include switches, joysticks, or other mechanical input devices, and/or virtual buttons and other controls implemented on a suitable touchscreen video display. For example, primary video display device 104 in gaming machine 100 provides a convenient display device for implementing touchscreen controls.

It will be appreciated that gaming machines may also include a number of other player interface devices in addition to devices that are considered player controls for use in playing a particular game. Gaming machine 100 also includes a currency/voucher acceptor having an input ramp 112, a player card reader having a player card input 114, and a voucher/receipt printer having a voucher/receipt output 115. Audio speakers 116 generate an audio output to enhance the user's playing experience. Numerous other types of devices may be included in gaming machines that may be used according to the present invention.

FIG. 3B shows a logical and hardware block diagram 200 of gaming machine 100 which includes a central processing unit (CPU) 205 along with random access memory 206 and nonvolatile memory or storage device 207. All of these devices are connected on a system bus 208 with an audio controller 209, a network controller 210, and a serial interface 211. A graphics processor 215 is also connected on bus 208 and is connected to drive primary video display device 104 and secondary video display device 107 (both mounted on cabinet 101 as shown in FIG. 3A). A second graphics processor 216 is also connected on bus 208 in this example to drive the auxiliary display devices 108 and 109 also shown in FIG. 3A. As shown in FIG. 3B, gaming machine 100 also includes a touchscreen controller 217 connected to system bus 208. Touch screen controller 217 is also connected via signal path 218 to receive signals from a touchscreen element associated with primary video display device 104. It will be appreciated that the touchscreen element itself typically comprises a thin film that is secured over the display surface of primary video display device 104. The touchscreen element itself is not illustrated or referenced separately in the figures.

Those familiar with data processing devices and systems will appreciate that other basic electronic components will be included in gaming machine 100 such as a power supply, cooling systems for the various system components, audio amplifiers, and other devices that are common in gaming machines. These additional devices are omitted from the drawings so as not to obscure the present invention in unnecessary detail.

All of the elements 205, 206, 207, 208, 209, 210, and 211 shown in FIG. 3B are elements commonly associated with a personal computer. These elements are preferably mounted on a standard personal computer chassis and housed in a standard personal computer housing which is itself mounted in cabinet 101 shown in FIG. 3A. Alternatively, the various electronic components may be mounted on one or more circuit boards housed within cabinet 101 without a separate enclosure such as those found in personal computers. Those familiar with data processing systems and the various data processing elements shown in FIG. 3B will appreciate that many variations on this illustrated structure may be used within the scope of the present invention. For example, since serial communications are commonly employed to communicate with a touchscreen controller such as touchscreen controller 217, the touchscreen controller may not be connected on system bus 208, but instead include a serial communications line to serial interface 211, which may be a USB controller or a IEEE 1394 controller for example. It will also be appreciated that some of the devices shown in FIG. 3B as being connected directly on system bus 208 may in fact communicate with the other system components through a suitable expansion bus. Audio controller 209, for example, may be connected to the system via a PCI bus. System bus 208 is shown in FIG. 3B merely to indicate that the various components are connected in some fashion for communication with CPU 205 and is not intended to limit the invention to any particular bus architecture. Numerous other variations in the gaming machine internal structure and system may be used without departing from the principles of the present invention.

It will also be appreciated that graphics processors are also commonly a part of modern computer systems. Although separate graphics processor 215 is shown for controlling primary video display device 104 and secondary video display device 107, and graphics processor 216 is shown for controlling both auxiliary display devices 108 and 109, it will be appreciated that CPU 205 may control all of the display devices directly without any intermediate graphics processor. In some embodiments, the Thundering Herd expanding reel graphics may be displayed on secondary video display 107 rather than beside the array of selectable game pieces on the primary display. The invention is not limited to any particular arrangement of processing devices for controlling the video display devices included with gaming machine 100. Also, a gaming machine implementing the present invention is not limited to any particular number of video display device or other types of display devices.

In the illustrated gaming machine 100, CPU 205 executes software which ultimately controls the entire gaming machine including the receipt of player inputs and the presentation of the graphic symbols displayed according to the invention through the display devices 104, 107, 108, and 109 associated with the gaming machine. As will be discussed further below, CPU 205 either alone or in combination with graphics processor 215 may implement a presentation controller for performing functions associated with a primary game that may be available through the gaming machine and may also implement a game client for directing one or more display devices at the gaming machine to display portions of the Thundering Herd expanding reel game according to the present invention. CPU 205 also executes software related to communications handled through network controller 210, and software related to various peripheral devices such as those connected to the system through audio controller 209, serial interface 211, and touchscreen controller 217. CPU 205 may also execute software to perform accounting functions associated with game play. Random access memory 206 provides memory for use by CPU 205 in executing its various software programs while the nonvolatile memory or storage device 207 may comprise a hard drive or other mass storage device providing storage for programs not in use or for other data generated or used in the course of gaming machine operation. Network controller 210 provides an interface to other components of a gaming system in which gaming machine 100 is included. In particular, network controller 210 provides an interface to a game controller which controls certain aspects of the Thundering Herd expanding reel game as will be discussed below in connection with FIG. 3.

It should be noted that the invention is not limited to gaming machines employing the personal computer-type arrangement of processing devices and interfaces shown in example gaming machine 100. Other gaming machines through which a Thundering Herd expanding reel game is implemented may include one or more special purpose processing devices to perform the various processing steps for implementing the present invention. Unlike general purpose processing devices such as CPU 205, these special purpose processing devices may not employ operational program code to direct the various processing steps.

It should also be noted that the invention is not limited to gaming machines including only video display devices for conveying results. It is possible to implement a Thundering Herd expanding reel game within the scope of the present invention using an electro mechanical arrangement or even a purely mechanical arrangement for displaying the symbols needed to complete the Thundering Herd expanding reel game as described herein. However, the most preferred forms of the invention utilize one or more video display devices for displaying the spinning reels, the mystery expansion feature, and the expanded array bonus features. For example, a gaming machine suitable for providing a Thundering Herd expanding reel game may include a mechanical reel-type display rather than a video-type display device for displaying results in a primary game, and include a video display device for presenting the expanding reels separately.

Still referring to the hardware and logical block diagram 200 showing an example design for a gaming machine 100, the depicted machine in operation is controlled generally by CPU 205 which stores operating programs and data in memory 207 with wagering game 204, user interface 220, network controller 210, audio/visual controllers, and reel assembly 213 (if mechanical reel configuration). CPU or game processor 205 may comprise a conventional microprocessor, such as an Intel Pentium microprocessor, mounted on a printed circuit board with supporting ports, drivers, memory, software, and firmware to communicate with and control gaming machine operations, such as through the execution of coding stored in memory 207 including one or more wagering games 204. Game processor 205 connects to user interface 220 such that a player may enter input information and game processor 205 may respond according to its programming, such as to apply a wager and initiate execution of a game.

Figure 4A:
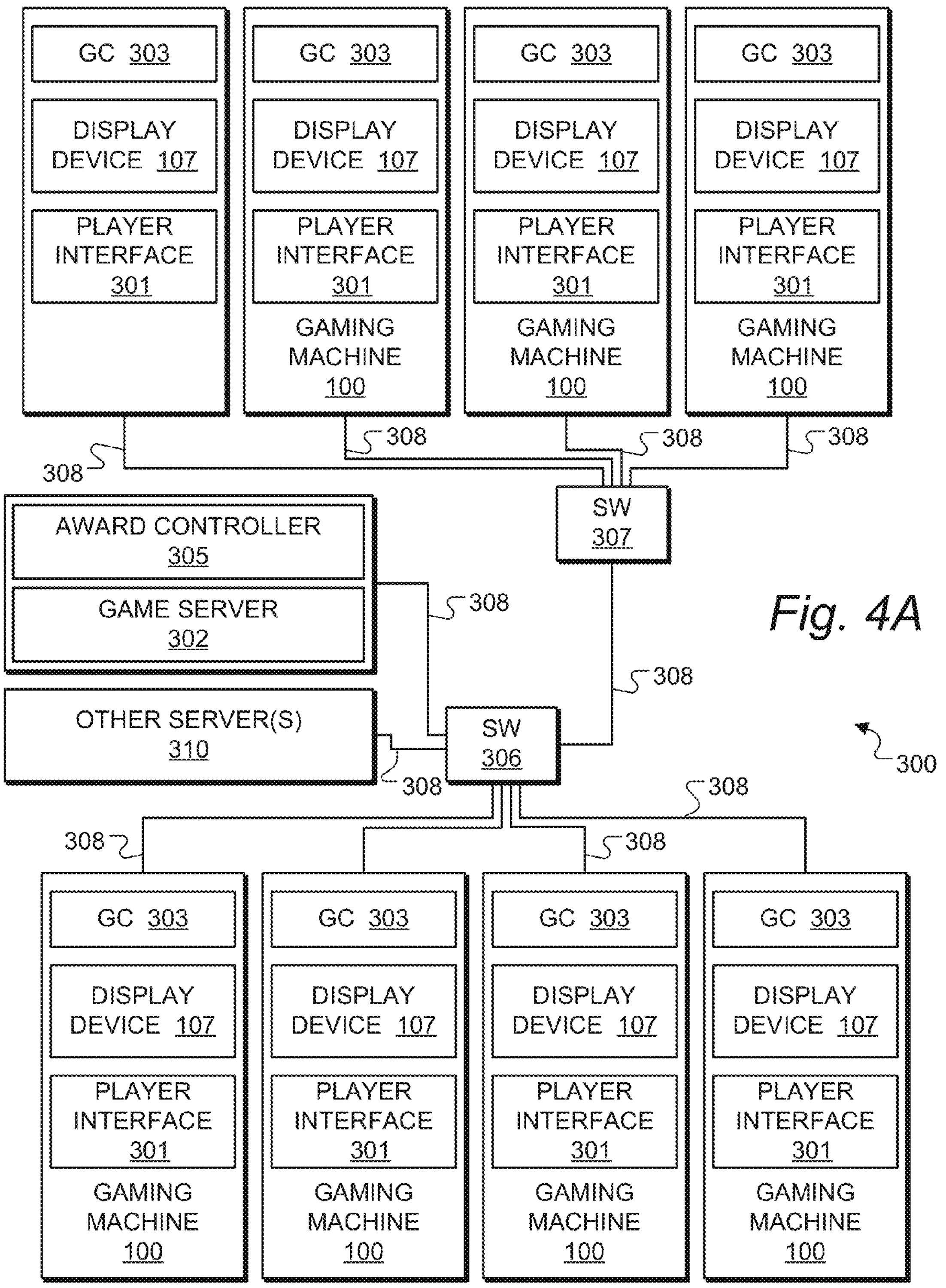
FIG. 4A is a system block diagram of a gaming system according to one embodiment of the present invention.
Figure 4B:
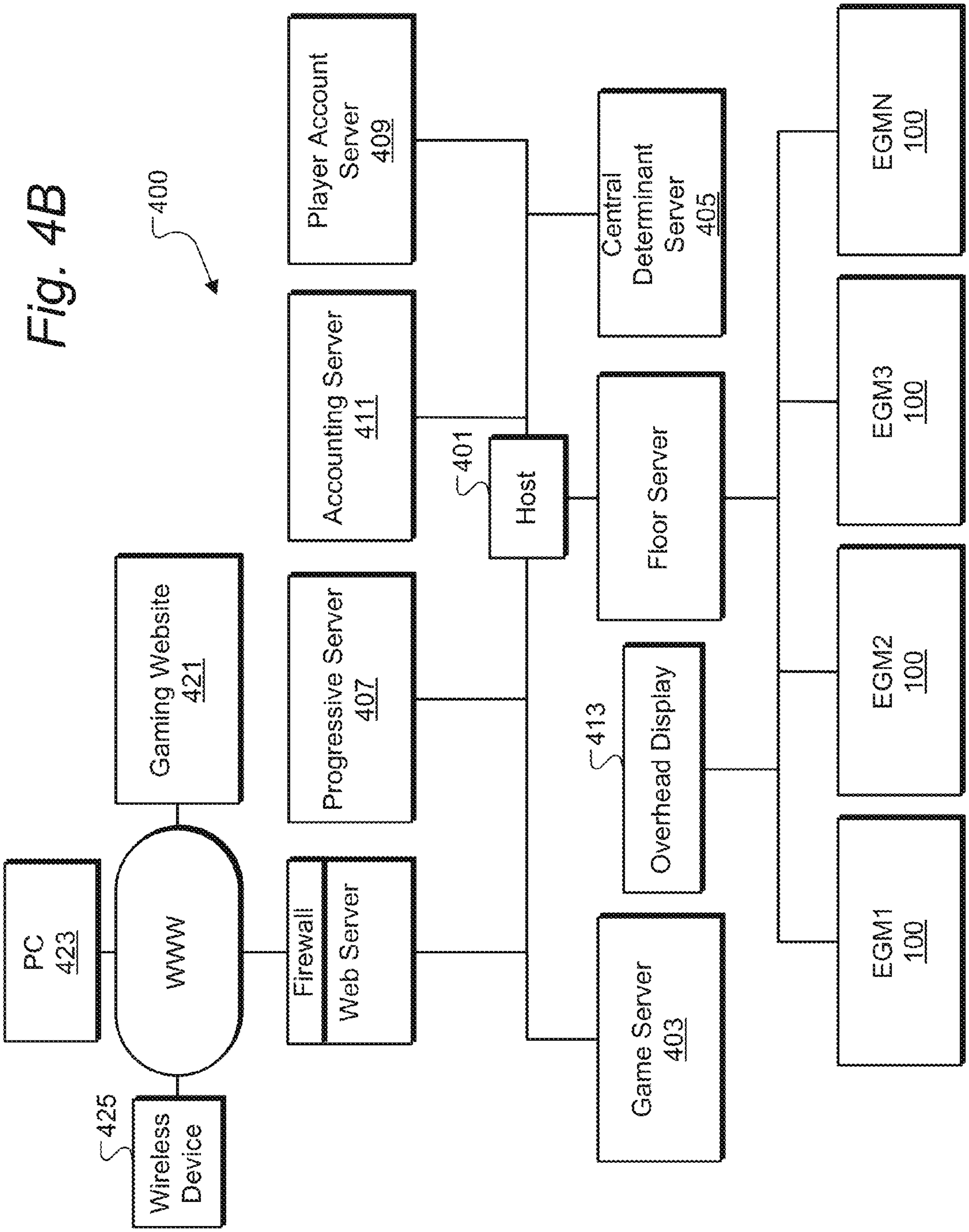
FIG. 4B is a system block diagram of a gaming system according to another embodiment.

Game processor 205 also may connect through network controller 210 to a gaming network, such as example casino server network 400 shown in FIG. 4B. Referring now to FIG. 4B, the casino server network 400 may be implemented over one or more site locations and include host server 401, remote game server 403 (which may be configured to provide game processor functionality including determining game outcomes and providing audio/visual instructions to a remote gaming device), central determinant server 405 (which may be configured to determine lottery, bingo, or other centrally determined game outcomes and provide the information to networked gaming machines 100 providing lottery and bingo-based wagering games to patrons), progressive server 407 (which may be configured to accumulate a progressive pool from a portion of wagering proceeds or operator marketing funds and to award progressive awards upon the occurrence of a progressive award winning event to one or more networked gaming machines 100), player account server 409 (which may be configured to collect and store player information and/or awards and to provide player information to gaming machines 100 after receiving player identification information such as from a player card), and accounting server 411 (which may be configured to receive and store data from networked gaming machines 100 and to use the data to provide reports and analyses to an operator). Through its network connection, gaming machine 100 may be monitored by an operator through one or more servers such as to assure proper operation, and, data and information may be shared between gaming machine 100 and respective of the servers in the network such as to accumulate or provide player promotional value, to provide server-based games, or to pay server-based awards.

Referring now to FIG. 4A, a gaming system 300 according to another embodiment of the present invention is shown again in a network and system diagram format. System 300 includes a number of gaming machines, each comprising a gaming machine 100 in this example implementation. For purposes of describing system 300, each gaming machine 100 in FIG. 4A is shown as including a video display device 107 and a player interface that may include buttons, switches, or other physical controls and/or touchscreen controls as discussed above in connection with FIG. 4A. This player interface is labeled 301 in FIG. 4A. System 300 further includes a game server 302 and a respective game client 303 (abbreviated "GC" in FIG. 4A) included with each respective gaming machine 100. In the form of the invention shown in FIG. 4A these two components, game server 302 and the game client components 303 combine to implement a game control arrangement which will be described in detail below. System 300 also includes an award controller 305, which is shown in FIG. 4A as being associated with game server 302 to indicate that the two components may be implemented through a common data processing device/computer system. Gaming machines 100, game server 302, and award controller 305 are connected in a network communication arrangement including first and second network switches 306 and 307, connected together through various wired or wireless signal paths, all shown as communications links 308 in FIG. 4A.

Each gaming machine 100, and particularly player interface 301 associated with each gaming machine, allows a player to make any inputs that may be required to make the respective gaming machine eligible for a Thundering Herd expanding reel game, and make selections of any selectable objects displayed at the respective gaming machine in the course of the Thundering Herd expanding reel game. Player interface 301 also allows a player at the gaming machine to initiate plays in a primary game available through the gaming machine in some implementations. The respective video display device 107 associated with each respective gaming machine 100 is used according to the invention to generate the graphic displays to show the various elements of a Thundering Herd expanding reel game at the respective gaming machine.

The game control arrangement made up of game server 302 and the respective game client 303 at a given gaming machine functions to control the respective video display device 107 for that gaming machine to display the graphical presentation of the expanding array. Award controller 305 is responsible for awarding prizes for a player's participation in a Thundering Herd expanding reel game, and maintaining progressive prize information where the Thundering Herd expanding reel game offers one or more progressive prizes. The network arrangement made up of network switches 306 and 307, and the various communication links 308 shown in FIG. 4A is illustrated merely as an example of a suitable communications arrangement. It should be noted that the game control arrangement, or as it is referred to generally the "game controller," may be implemented in some embodiments entirely on the gaming machine. This is especially true in jurisdictions that allow Class III gaming conducted with random number generators at each gaming machine. The present invention is not limited to any particular communications arrangement for facilitating communications between game server 302 and various gaming machines 100. Any wired or wireless communication arrangement employing any suitable communications protocols (such as TCP/IP for example) may be used in an apparatus according to the invention.

FIG. 4A shows other server(s) 310 included in the network. This illustrated "other server(s)" element 310 may include one or more data processing devices for performing various functions related to games conducted through system 300 and any other games that may be available to players through gaming machines 100. For example, apparatus 300 may be accounting servers providing support for cashless gaming or various forms of mixed cash/cashless gaming through the various gaming machines 100. In this example, an additional one of the other servers 310 will be included in apparatus 300 for supporting these types of wagering and payout systems. As another example, the various gaming machines 100 included in system 300 may allow players to participate in a game (primary game) other than the Thundering Herd expanding reel game described herein, and this other game may rely on a result identified at or in cooperation with a device that is remote from the gaming machines. In this example, another server 310 may be included in the system for identifying results for the primary game and communicating those results to the various gaming machines 100 as necessary. Generally, the other server(s) 310 shown in FIG. 4A are shown only to indicate that numerous other components may be included along with the elements that participate in providing Thundering Herd expanding reels games according to the present invention. Other server(s) 310 may provide record keeping, player tracking, accounting, result identifying services, or any other services that may be useful or necessary in a gaming system.

Referring to FIG. 4B, a block diagram of another example networked gaming system 400 associated with one or more gaming facilities is shown, including one or more networked gaming machines 100 in accordance with one or more embodiments. With reference to FIG. 4B, while a few servers have been shown separately, they may be combined or split into additional servers having additional capabilities.

As shown, networked gaming machines 100 (EGM1-EGMN) and one or more overhead displays 413 may be network connected and enable the content of one or more displays of gaming machines 100 to be mirrored or replayed on an overhead display. For example, the primary display content may be stored by the display controller or game processor 205 and transmitted through network controller 210 to the overhead display controller either substantially simultaneously or at a subsequent time according to either periodic programming executed by game processor 205 or a triggering event, such as a jackpot or large win, at a respective gaming machine 100. In the event that gaming machines 100 have cameras installed, the respective players' video images may be displayed on overhead display 413 along with the content of the player's display 100 and any associated audio feed.

In one or more embodiments, game server 403 may provide server-based games and/or game services to network connected gaming devices, such as gaming machines 100 (which may be connected by network cable or wirelessly). Progressive server 407 may accumulate progressive awards by receiving defined amounts (such as a percentage of the wagers from eligible gaming devices or by receiving funding from marketing or casino funds) and provide progressive awards to winning gaming devices upon a progressive event, such as a progressive jackpot game outcome or other triggering event such as a random or pseudo-random win determination at a networked gaming device or server (such as to provide a large potential award to players playing the community feature game). Accounting server 411 may receive gaming data from each of the networked gaming devices, perform audit functions, and provide data for analysis programs, such as the IGT Mariposa program bundle.

Player account server 409 may maintain player account records, and store persistent player data such as accumulated player points and/or player preferences (e.g. game personalizing selections or options). For example, the player tracking display may be programmed to display a player menu that may include a choice of personalized gaming selections that may be applied to a gaming machine 100 being played by the player.

In one or more embodiments, the player menu may be programmed to display after a player inserts a player card into the card reader. When the card reader is inserted, an identification may be read from the card and transmitted to player account server 409. Player account server 409 transmits player information through network controller 210 to user interface 220 for display on the player tracking display. The player tracking display may provide a personalized welcome to the player, the player's current player points, and any additional personalized data. If the player has not previously made a selection, then this information may or may not be displayed. Once the player makes a personalizing selection, the information may be transmitted to game processor 205 for storing and use during the player's game play. Also, the player's selection may be transmitted to player account server 409 where it may be stored in association with the player's account for transmission to the player in future gaming sessions. The player may change selections at any time using the player tracking display (which may be touch sensitive or have player-selectable buttons associated with the various display selections).

In one or more embodiments, a gaming website may be accessible by players, e.g. gaming website 421, whereon one or more games may be displayed as described herein and played by a player such as through the use of personal computer 423 or handheld wireless device 425 (e.g. Blackberry cell phone, Apple iPhone, personal data assistant (PDA), iPad, etc.). To enter the website, a player may log in with a username (that may be associated with the player's account information stored on player account server 409 or be accessible by a casino operator to obtain player data and provide promotional offers), play various games on the website, make various personalizing selections and save the information, so that during a next gaming session at a casino establishment, the player's playing data and personalized information may be associated with the player's account and accessible at the player's selected gaming machine 100.

Referring generally to the description herein, any use of ordinal terms such as "first," "second," "third," etc., to refer to an element does not by itself connote any priority, precedence, or order of one element over another, or the temporal order in which acts of a method are performed. Rather, unless specifically stated otherwise, such ordinal terms are used merely as labels to distinguish one element having a certain name from another element having a same name (but for use of the ordinal term).

Further, as described herein, the various features have been provided in the context of various described embodiments, but may be used in other embodiments. The combinations of features described herein should not be interpreted to be limiting, and the features herein may be used in any working combination or sub-combination according to the invention. This description should therefore be interpreted as providing written support, under U.S. patent law and any relevant foreign patent laws, for any working combination or some sub-combination of the features herein.

The above described preferred embodiments are intended to illustrate the principles of the invention, but not to limit the scope of the invention. Various other embodiments and modifications to these preferred embodiments may be made by those skilled in the art without departing from the scope of the present invention.

What is claimed is:

1. A method performed on an electronic gaming machine, the method including:

(a) causing an electronic display system of the gaming machine to display a number of simulated reels for a wagering game, the number of simulated reels together defining a base number of symbol locations in a base area of the display system;

(b) for a first spin causing the display system to display a reel spinning simulation in which each simulated reel is displayed in a simulated spinning condition;

(c) with a processing device associated with the gaming machine, determining whether to expand the base number of symbol locations for the first spin;

(d) in response to a determination to expand the base number of symbol locations for the first spin, and while continuing to show each simulated reel in the simulated spinning condition, causing the display system to display an expansion of each simulated reel in the simulated spinning condition into a first expanded area beyond the base area, the first expanded area before the expansion substantially comprising decorative graphics or informational graphics and having no gaming symbols, the first expanded area after the expansion showing an additional symbol location shown to be joined to the base number of symbol locations resulting in the first expanded area and the base area together comprising a first increased symbol location area;

(e) after expanding each simulated reel in the simulated spinning condition into the first expanded area, causing the display system to end the reel spinning simulation so that each simulated reel in the simulated spinning condition is displayed as coming to as top so as to display a respective game symbol at selected symbol locations in the base area and at the additional symbol location in the first expanded area;

(f) after displaying the respective game symbol at selected symbol locations in the base area and at the additional symbol location in the first expanded area, evaluating the first increased symbol location area for any winning patterns of game symbols, and awarding a prize for each winning pattern of game symbols; and (g) conducting at least one additional expansion, each additional expansion including causing the display system to display an additional reel spinning simulation in which each simulated reel is displayed in the simulated spinning condition, and, while continuing to display each simulated reel in the simulated spinning condition for the additional reel spinning simulation, causing the display system to expand each simulated reel of the additional reel spinning simulation into an additional expanded area beyond the base area and the first expanded area, the additional expanded area, the first expanded area, and base area comprising an additionally increased symbol location area providing further symbol locations.

2. The method of claim 1 further including lowering the probability that an additional expansion will occur from a first nonzero probability to a second nonzero probability after a designated number of additional expansions have occurred.

3. The method of claim 1 further including providing a scatter pattern bonus for scatter bonus symbols included in the first increased symbol location area.

4. The method of claim 1 further including, associated with the expansion of each simulated reel in the simulated spinning condition into the first expanded area, causing a payline to shift to encompass the additional symbol location in the first expanded area.

5. A gaming machine including:

(a) a display system;

(b) a player input system;

(c) at least one processor; and (d) at least one memory device storing instructions executable by the at least one processor to:

(i) cause the display system to display a number of simulated reels for a wagering game, the number of simulated reels together defining a base number of symbol locations in a base area of the display system;

(ii) for a first spin, cause the display system to display a reel spinning simulation in which each simulated reel is displayed in a simulated spinning condition;

(iii) determine whether to expand the base number of symbol locations for the first spin;

(iv) in response to a determination to expand the base number of symbol locations for the first spin, and while continuing to show each simulated reel in the simulated spinning condition, cause the display system to display an expansion of each simulated reel in the simulated spinning condition into a first expanded area beyond the base area, the first expanded area before the expansion substantially comprising decorative graphics or informational graphics and having no gaming symbols, the first expanded area after the expansion showing an additional symbol location shown to be joined to the base number of symbol locations resulting in the first expanded area and the base area together comprising a first increased symbol location area;

(v) after expanding each simulated reel in the simulated spinning condition into the first expanded area, cause the display system to end the reel spinning simulation so that each simulated reel in the simulated spinning condition is displayed as coming to a stop so as to display a respective game symbol at selected symbol locations in the base area and at the additional symbol location in the first expanded area;

(vi) after displaying the respective game symbol at selected symbol locations in the base area and at the additional symbol location in the first expanded area, evaluate the first increased symbol location area for any winning patterns of game symbols, and award a prize for each winning pattern of game symbols; and (vii) conducting at least one additional expansion, each additional expansion including causing the display system to display an additional reel spinning simulation in which each simulated reel is displayed in the simulated spinning condition, and, while continuing to display each simulated reel in the simulated spinning condition for the additional reel spinning simulation, causing the display system to expand each simulated reel of the additional reel spinning simulation into an additional expanded area beyond the base area and the first expanded area, the additional expanded area, the first expanded area, and base area comprising an additionally increased symbol location area providing further symbol locations.

6. The gaming machine of claim 5 wherein the at least one memory device stores instructions executable by the at least one processor to lower the probability that an additional expansion will occur from a first nonzero probability to a second nonzero probability after a designated number of additional expansions have occurred.

7. The gaming machine of claim 5 wherein the at least one memory device stores instructions executable by the at least one processor to provide a scatter pattern bonus for scatter bonus symbols included in the first increased symbol location area.

8. The gaming machine of claim 5 wherein the at least one memory device stores instructions executable by the at least one processor to, associated with the expansion of each simulated reel in the simulated spinning condition into the first expanded area, cause a payline to shift to encompass the additional symbol location in the first expanded area.

9. A program product comprising one or more non-transitory computer readable data storage devices storing program code, the program code including:

(a) player input program code executable by at least one processor to receive a play input entered through a player input system of a gaming machine, the play input being associated with a wager for a play of a wagering game and initiating a play of the wagering game;

(b) game program code executable by the at least one processor to:

(i) cause a display system of the gaming machine to display a number of simulated reels for the wagering game, the number of simulated reels together defining a base number of symbol locations in a base area of the display system;

(ii) for a first spin, cause the display system to display a reel spinning simulation in which each simulated reel is displayed in a simulated spinning condition;

(iii) determine whether to expand the base number of symbol locations for the first spin;

(iv) in response to a determination to expand the base number of symbol locations for the first spin, and while continuing to show each simulated reel in the simulated spinning condition, cause the display system to display an expansion of each simulated reel in the simulated spinning condition into a first expanded area beyond the base area, the first expanded area before the expansion substantially comprising decorative graphics or informational graphics and having no gaming symbols, the first expanded area after the expansion showing an additional symbol location shown to be joined to the base number of symbol locations resulting in the first expanded area and the base area together comprising a first increased symbol location area;

(v) after expanding each simulated reel in the simulated spinning condition into the first expanded area, cause the display system to end the reel spinning simulation so that each simulated reel in the simulated spinning condition is displayed as coming to a stop so as to display a respective game symbol at selected symbol locations in the base area and at the additional symbol location in the first expanded area; and (vi) after displaying the respective game symbol at selected symbol locations in the base area and at the additional symbol location in the first expanded area, evaluate the first increased symbol location area for any winning patterns of game symbols, and awarding a prize for each winning pattern of game symbols; and (vii) conduct at least one additional expansion, each additional expansion including causing the display system to display an additional reel spinning simulation in which each simulated reel is displayed in the simulated spinning condition, and, while continuing to display each simulated reel in the simulated spinning condition for the additional reel spinning simulation, causing the display system to expand each simulated reel of the additional reel spinning simulation into an additional expanded area beyond the base area and the first expanded area, the additional expanded area comprising an additionally increased symbol location area providing further symbol locations.

10. The program product of claim 9 wherein the game program code is also executable by the at least one processor to lower the probability that an additional expansion will occur from a first nonzero probability to a second nonzero probability after a designated number of additional expansions have occurred.

11. The program product of claim 9 wherein the game program code is also executable by the at least one processor to provide a scatter pattern bonus for scatter bonus symbols included in the first increased symbol location area.

12. The program product of claim 9 wherein the game program code is also executable by the at least one processor to, associated with the expansion of each simulated reel in the simulated spinning condition into the first expanded area, cause a payline to shift to encompass a symbol location in the first expanded area.

* * * * *